(12) United States Patent
Chang et al.

(10) Patent No.: US 10,097,302 B2
(45) Date of Patent: Oct. 9, 2018

(54) COMMUNICATION RECEIVING APPARATUS, SIGNAL RECEIVING METHOD THEREOF FOR RECOVERING DATA AND SIGNAL TRANSMITTING METHOD FOR GENERATING TRANSMITTING SIGNAL BASED ON CDMA TECHNOLOGY

(71) Applicant: I-SHOU UNIVERSITY, Kaohsiung (TW)

(72) Inventors: Ho-Hsuan Chang, Kaohsiung (TW); Shih-Chiang Lin, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 188 days.

(21) Appl. No.: 15/202,558

(22) Filed: Jul. 5, 2016

(65) Prior Publication Data
US 2017/0195078 A1   Jul. 6, 2017

(30) Foreign Application Priority Data

Dec. 30, 2015  (TW) .............................. 104144349 A

(51) Int. Cl.
*H04J 13/00* (2011.01)
*H04J 13/16* (2011.01)
(Continued)

(52) U.S. Cl.
CPC .......... *H04J 13/0022* (2013.01); *H04J 13/16* (2013.01); *H04L 5/0021* (2013.01); *H04L 27/2614* (2013.01)

(58) Field of Classification Search
CPC .... H04J 13/0022; H04J 13/16; H04L 27/2614
See application file for complete search history.

(56) References Cited

U.S. PATENT DOCUMENTS 5,754,604 A * 5/1998 Li ..................... H04B 1/70752
370/515
8,699,956 B2  4/2014 Mow et al.
(Continued)

FOREIGN PATENT DOCUMENTS

CN    102130704    7/2011
TW    200910805    3/2009

OTHER PUBLICATIONS

"Office Action of Taiwan Counterpart Application", dated Dec. 27, 2016, p. 1-p. 6.
(Continued)

*Primary Examiner* — Gregory B Sefcheck
*Assistant Examiner* — Jael M Ulysse
(74) *Attorney, Agent, or Firm* — JCIPRNET

(57) ABSTRACT

A communication receiving apparatus, a signal receiving method thereof, and a signal transmitting method based Code Division Multiple Access (CDMA) technology are provided. A communication transmitting apparatus encodes an original data sequence based on a perfect Gaussian integer sequence (PGIS) to generate a spread signal and transmits a radio frequency (RF) signal including the spread signal. An autocorrelation function of the PGIS conforms to an impulse characteristic, and the PGIS has a spectrum with equal magnitude. The communication receiving apparatus obtains the RF signal from the communication transmitting apparatus and transforms the RF signal into a baseband signal. The baseband signal is de-modulated into a data stream by the communication receiving apparatus. The data stream is recovered into at least one data value of the original data sequence based on the PGIS by the communication receiving apparatus.

13 Claims, 5 Drawing Sheets

(51) Int. Cl.
*H04L 5/00* (2006.01)
*H04L 27/26* (2006.01)

(56) References Cited

U.S. PATENT DOCUMENTS

| | | | | |
|---|---|---|---|---|
| 2001/0017881 | A1* | 8/2001 | Bhatoolaul | H04B 1/707 375/130 |
| 2002/0165810 | A1* | 11/2002 | Evertsz | G06Q 40/00 705/36 R |
| 2002/0176516 | A1* | 11/2002 | Jeske | H04L 1/20 375/316 |
| 2003/0232612 | A1* | 12/2003 | Richards | H04B 1/7093 455/323 |
| 2004/0264592 | A1* | 12/2004 | Sibecas | H01Q 21/24 375/267 |
| 2005/0008097 | A1* | 1/2005 | Tjhung | H03M 13/251 375/302 |
| 2005/0180369 | A1* | 8/2005 | Hansen | H04B 7/04 370/338 |
| 2006/0085497 | A1* | 4/2006 | Sehitoglu | G06F 17/142 708/405 |
| 2007/0211786 | A1* | 9/2007 | Shattil | H04B 1/707 375/141 |
| 2008/0279287 | A1* | 11/2008 | Asahina | H04B 1/69 375/242 |
| 2009/0121749 | A1* | 5/2009 | Roberts | H03B 29/00 327/105 |
| 2009/0207934 | A1* | 8/2009 | Ragot | H03M 7/00 375/295 |
| 2010/0290506 | A1* | 11/2010 | Kerr | H04B 1/7075 375/147 |
| 2010/0309959 | A1* | 12/2010 | Lakkis | H04J 13/16 375/150 |
| 2010/0329320 | A1* | 12/2010 | Umehara | G06N 7/02 375/227 |
| 2011/0002366 | A1* | 1/2011 | Michaels | H04B 1/7115 375/148 |
| 2011/0002463 | A1* | 1/2011 | Michaels | H04K 1/02 380/268 |
| 2011/0222584 | A1* | 9/2011 | Michaels | H04J 13/0018 375/130 |
| 2012/0033714 | A1* | 2/2012 | Lakkis | H04B 1/71632 375/147 |
| 2014/0025314 | A1* | 1/2014 | Crowell | H01J 49/0036 702/32 |
| 2015/0117470 | A1* | 4/2015 | Ryan | H04L 69/04 370/477 |
| 2015/0124713 | A1* | 5/2015 | Salhov | H01Q 3/2605 370/329 |

OTHER PUBLICATIONS

Sen-Hung Wang et al., "Novel Comb Spectrum CDMA System Using Perfect Gaussian Integer Sequences", 2015 IEEE Global Communications Conference (Globecom), Dec. 6-10, 2015, pp. 1-6.

Wei-Wen Hu et al., "Gaussian Integer Sequences With Ideal Periodic Autocorrelation Functions", IEEE Transactions on Signal Processing 60(11), Nov. 2012, pp. 6074-6079.

Luke et al., "Binary and Quadriphase Sequences with Optimal Autocorrelation Properties: A survey," IEEE Trans. Inf. Theory, Dec. 2003, pp. 3271-3282.

Hu et al., "Gaussian integer sequences with ideal periodic autocorrelation functions," IEEE Trans. Signal Process., Nov. 2012, pp. 6074-6079.

Yang et al., "Perfect Gaussian integer sequences of odd prime length," IEEE Signal Process. Letters, Oct. 2012, pp. 615-618.

Chang et al., "Perfect Gaussian Integer Sequences of Arbitrary Composite Length," IEEE Trans. Inf. Theory, Jul. 2015, pp. 4107-4115.

"Office Action of Taiwan Counterpart Application", dated Oct. 19, 2016, p. 1-p. 6.

S.-H. Wang et al., "Gaussian integer sequences with ideal periodic autocorrelation functions", IEEE Trans. Signal Process., vol. 60, No. 11, Nov. 2012, 6074-6079.

* cited by examiner

COMMUNICATION RECEIVING APPARATUS, SIGNAL RECEIVING METHOD THEREOF FOR RECOVERING DATA AND SIGNAL TRANSMITTING METHOD FOR GENERATING TRANSMITTING SIGNAL BASED ON CDMA TECHNOLOGY

CROSS REFERENCE TO RELATED APPLICATION

This application claims the priority benefit of Taiwan application serial no. 104144349, filed on Dec. 30, 2015. The entirety of the above-mentioned patent application is hereby incorporated by reference herein and made a part of specification.

BACKGROUND OF THE DISCLOSURE

Field of the Disclosure

The disclosure relates to a signal processing method based on Code Division Multiple Access (CDMA) technology, more particularly, a communication receiving apparatus, a signal receiving method thereof, a signal processing method, and a signal transmitting method.

Description of Related Art

Current electronic devices (e.g. mobile phones, DVD, fiber optics communication, digital TV set-top boxes) are digital structures which are capable of transmitting millions of bit code such as 0 and 1 within a second. Owing to efficiency of encoding technology, errors seldom occur even for such rapid communication transmission with mass data volume. The following example is used to explain encoding technology of communication. Suppose there are three brothers in the Chen family whose names are Chen O, Chen Q, and Chen D. Due to the similarity of their first names, it is easy to get their names mixed up. However, the number of words can be increased (e.g. Chen A O, Chen B Q, and Chen C D). This way, even when the last letter of the name is mistaken, the recipient can automatically correct the mistake through identifying the inserted channel codes (such as A, B, and C). Therefore, the sprit of encoding is adding identification codes into original codes to increase the differences between the transmitted data and thereby decrease the chances of error occurring, and this technology is called the channel coding theory.

CDMA is one of the encoding technologies as described above. It started as a military communication technology, and in around 2000 became a key technology of the third generation (3G) mobile communication standard (e.g. Wideband Code Division Multiple Access (W-CDMA)). Using CDMA technology to encode and decode data can greatly increase utilization rate of wireless channels and increase the ability to reduce interference. The encoding and decoding usually utilizes spread codes (e.g. pseudo-noise (PN) sequence, Walsh code, etc) to encode data sequence to implement spread signal technology.

SUMMARY OF THE DISCLOSURE

The disclosure provides a communication receiving apparatus, a signal receiving method thereof, a signal processing method, and a signal transmitting method that encode and decode a signal based on a perfect Gaussian integer sequence (PGIS), and implements PGIS in CDMA technology to enhance system performance.

The communication receiving apparatus of the disclosure is based on a CDMA technology, and includes at least (but not limited to) a receiving module and a processing circuit. The receiving module is configured to receive radio frequency (RF) signal and transform the RF signal into a baseband signal, The RF signal includes a spread signal obtained from encoding an original data sequence based on a PGIS. An autocorrelation function of the PGIS conforms to an impulse characteristic, and the PGIS has a spectrum with equal magnitude. The processing circuit coupled to the receiving module and includes a demodulator and a decoding module. The baseband signal is de-modulated into a data stream by the demodulator. The decoding module is coupled to the demodulator, and recovers the data stream into at least one data value of the original data sequence based on the PGIS.

From another perspective, the disclosure provides a signal receiving method configured for a communication receiving apparatus based on CDMA. The method includes the following steps: receiving RF signal and transforming the RF signal into a baseband signal. The RF signal includes a spread signal obtained from encoding an original data sequence based on a PGIS. An autocorrelation function of the PGIS conforms to impulse characteristic, and the PGIS has spectrum with equal magnitude. The baseband signal is de-modulated into a data stream. The data stream is recovered into at least one data value of the original data sequence based on the PGIS.

The disclosure also proposes a signal processing method configured adapted for a communication transmitting apparatus and a communication receiving apparatus based on CDMA. The method includes the following steps: The communication transmitting apparatus encodes an original data sequence based on a PGIS so as to generate a spread signal, and transmits RF signal including the spread signal. An autocorrelation function of the PGIS conforms to impulse characteristic, and the PGIS has a spectrum with equal magnitude. The communication receiving apparatus obtains the RF signal from the communication transmitting apparatus and transforms the RF signal into a baseband signal. The baseband signal is de-modulated into a data stream by the communication receiving apparatus. The data stream is recovered into at least one data value of the original data sequence based on the PGIS by the communication receiving apparatus.

On the other hand, the disclosure also proposes a signal transmitting method adapted for a communication transmitting apparatus based on CDMA. The method includes the following steps: Performing a circular shift to a PGIS by 0 to N−1 positions to generate spread sequences, the original data sequence includes N number of data value, the N being a positive integer. An autocorrelation function of the PGIS conforms to an impulse characteristic, and the PGIS has a spectrum with equal magnitude. Respectively multiplying the N number of data values of the original data sequence are by the spread sequences to generate encoding sequences. Combining and modulating the encoding sequences to generate a RF signal and transmitting the RF signal.

Based on the above, the communication receiving apparatus, the signal receiving method thereof, the signal processing method, and the signal transmitting method proposed in the embodiments of the present disclosure encode the original data sequence on the transmitting end (i.e. communication transmitting apparatus) with PGIS, and decodes through corresponding receiving end (i.e. the communication receiving apparatus) based on the PGIS, so as to recover the original data sequence. In a view of time domain, an autocorrelation function of the PGIS conforms to impulse characteristic. In a view of frequency domain, the PGIS has a spectrum with equal magnitude. This way, the embodiments of the disclosure can implement PGIS in existing CDMA structure and increase the number of encoding channels, signal to noise ratio (SNR), and the ability to suppress channel crosstalk.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
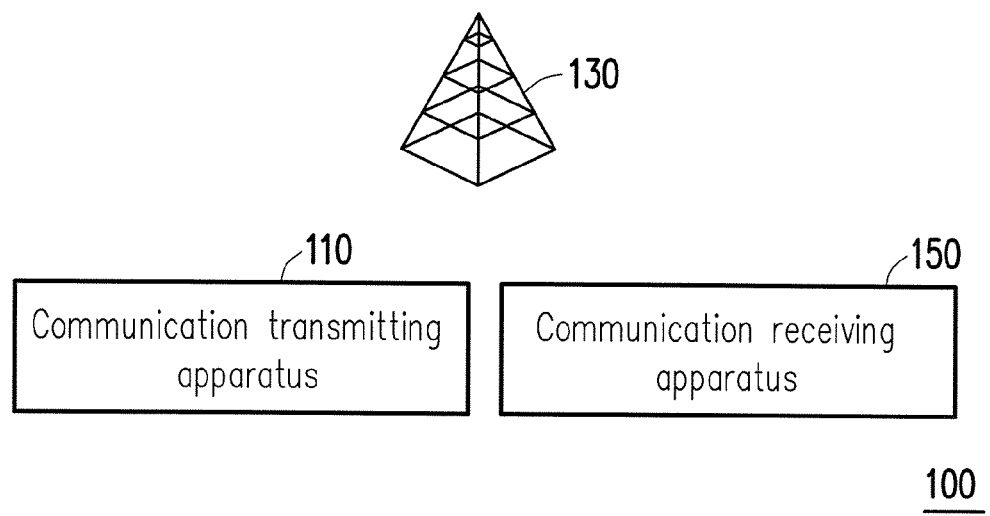
FIG. 1 is a schematic diagram illustrating a communication system according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

A sequence with ideal autocorrelation function can be referred to as a perfect sequence. Perfect sequences have long been widely used in modern communication systems for purposes such as synchronization, channel estimation, and reducing peak-to-average power ratio (PAPR) of sequences. Moreover, Frank-Zadoff-Chu (FZC) sequences have been implemented in 4G long term evolution (LTE) systems for synchronization and random access. In general, binary sequence or quadri-phase sequences have the advantages of high energy efficiency and easy implementation among the various ideal autocorrelation sequences. However, according to reference [1], "H. D. Luke, H. D. Schotten, and H. Hadinejad-Mahram, "Binary and quadriphase sequences with optimal autocorrelation properties: A survey," IEEE Trans. Inf. Theory, vol. 49, no. 12, pp. 3271-3282, December 2003," binary sequences of N>4 length and quadri-phase PGIS of N>16 length are unknown. Gaussian integer sequences is sequences in which all of elements having the form of complex numbers, that is a+bj, where a and b are integers. Although Gaussian integer sequences are simple to implement, construction of sequences with Gaussian integer and perfect characteristic has become a popular topic for research.

However, as of today, construction methods of PGIS are not complete and the results are limited. Known construction methods are explained as the following: a general form of even-length PGISs first appeared in reference [2], "W.-W. Hu, S.-H. Wang, and C.-P. Li, "Gaussian integer sequences with ideal periodic autocorrelation functions," IEEE Trans. Signal Process., vol. 60, no. 11, pp. 6074-6079, November 2012," in which the sequence is constructed by linearly combining 4 base sequences (or their circular shift base equivalents) using Gaussian integer coefficients of equal magnitudes. At the same time, PGISs of odd prime length are appeared in reference [3]. Y. Yang, X. H. Tang and Z. C. Zhou, "Perfect Gaussian integer sequences of odd prime length," IEEE Signal Process. Letters, vol. 19, no. 10, pp. 615-618, October 2012."

The disclosure has at least one embodiment based on the inventors' proposed paper [4] "Ho-Hsuan Chang, Chih-Peng Li, Chong-Dao Lee, Sen-Hung Wang, and Tsung-Cheng Wu, "Perfect Gaussian Integer Sequences of Arbitrary Composite Length," IEEE Trans. Inf., vol. 61, no. 7, pp. 4107-115, July, 2015" to obtain the advantages of PGIS while overcoming the issue of limited PGIS length. Reference [4] first begins with PGISs of prime number length p, and then PGISs constructed with any composite length N=nip by technique of upsampling m times. Based on the constructed mathematical structure (i.e. reference [4]), the embodiments of the disclosure implement PGISs to an existing CDMA system to enhance system performance. The following are embodiments of the teachings of the disclosure. Those practicing the embodiments may make appropriate adjustments to the embodiments not limited to the following.

FIG. 1 is a schematic diagram illustrating a communication system according to an embodiment of the present disclosure. Referring to FIG. 1, a communication system 100 includes a communication transmitting apparatus 110, a base station 130 (which is existed depending on the situation), and a communication receiving apparatus 150. The communication system 100 is configured for CDMA-based systems such as CDMA200 and Wideband Code Division Multiple Access (WCDMA). Note that the communication system 100 may include one or more of the communication transmitting apparatus 110 and the communication receiving apparatus 150, but the disclosure does not set a particular limitation thereto.

The communication transmitting apparatus 110 may be presented in various embodiments, for example (but not limited to), mobile station, advanced mobile station (AMS), server, user terminal, desktop computer, laptop computer, network computer, workstation, personal digital assistant (PDA), personal computer (PC), scanner, telephone device, pager, camera, access point, television, handheld video game device, music apparatuse, or wireless sensor.

Figure 2:
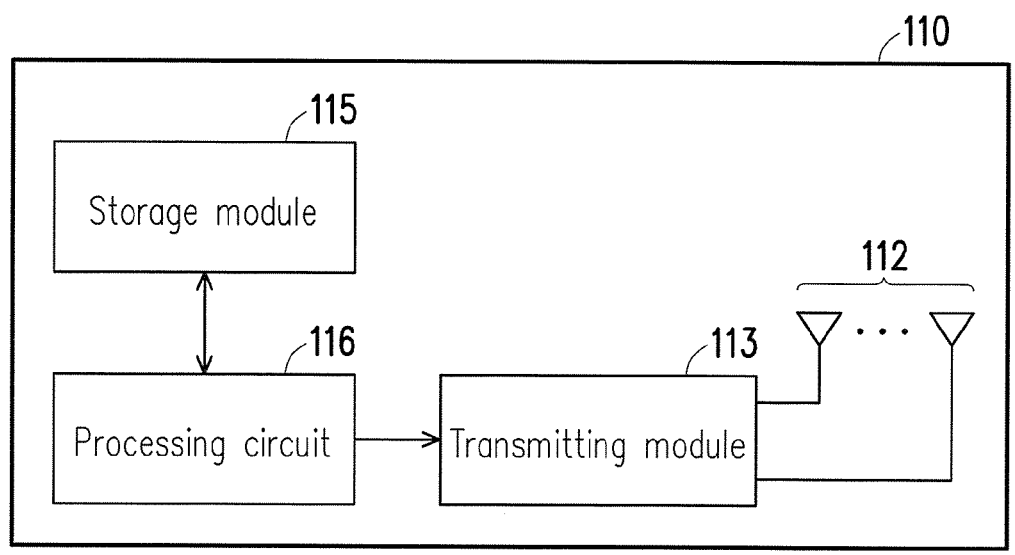
FIG. 2 is a block diagram illustrating a communication transmitting apparatus according to an embodiment of the present disclosure.

FIG. 2 is a block diagram illustrating a communication transmitting apparatus 110 according to an embodiment of the present disclosure. The communication transmitting apparatus 110 can be represented by at least the functional elements illustrated in FIG. 2. The communication transmitting apparatus 110 may include at least (but not limited to) one or more antenna unit 112, a transmitting module 113, a storage module 115, and a processing circuit 116. The transmitting module 113 is configured to wirelessly transmit downlink signals. The transmitting module 113 can also execute operations such as low-noise amplification, impedance matching, frequency mixing, up frequency conversion, filtering, amplification, digital-to-analog signal conversion, and other similar operations. The transmitting module 113 may be integrated into a chip or be composed of individual components or modules, and may be implemented through hardware or software.

The storage module 115 can be any type of fixed or portable random access memory (RAM), read-only memory (ROM), flash memory, hard drive, or other similar devices, or a combination thereof.

Functions of the processing circuit 116 can be implemented by a programmable unit such as a micro processor, a micro-controller, a digital signal processing (DSP) chip, or a field programmable gate array (FPGA). Functions of the processing circuit 116 can also be implemented by a stand alone electronic device or an integrated circuit (IC) and may be implemented by hardware or software. Note that depending on the design needs of the implementer, the wireless transmitting device 110 may include one or more processing circuits 116 so as to process functions such as modem, sensing, or display functions in an integrated or individual manner, but the disclosure does not set a particular limit thereto.

The processing circuit 116 is configured to process a digital signal and executes a signal transmitting method according to an exemplary embodiment of the disclosure. Moreover, the processing circuit 116 is coupled to the storage module 115 so as to store program codes, device configurations, codebooks, buffer or permanent data, and can also record modules executed by the processing circuit 116. For example, the processing circuit 116 can load a digital signal processing module to perform signal processing such as generation of original data sequence, encoding, serial to parallel conversion, constellation mapping, modulation, adding pilot signal and/or guard interval, convolution calculation, and conjugate transform. Alternatively, the processing circuit 116 can load a communication signaling processing module so as to perform a signaling control based on the communication technology to which it belongs (e.g. WCDMA).

Note that the various signal processing by the processing circuit 116 can also be performed through hardware component, module, or one or more devices such as encoders, modulators (e.g. one based on quadrature phase-shift keying, or QPSK, quadrature amplitude modulation, or QAM, etc.), multipliers, adders, duplexers, multiplexers, shifters, selectors, or a combination thereof. The disclosure does not particularly limit whether the processing circuit 116 implements the signal transmitting method of an exemplary embodiment through hardware or software.

The base station 130 can be represented in various embodiments. For example, including (but not limited to) an evolved node B (eNB), Home eNB, advanced base station (ABS), base transceiver system (BTS), access point, home base station, relay, scatter, repeater, intermediate node, intermediary, and/or a communication base station based on satellite. The base station 130 is used to forward data transmitted/received by the communication transmitting apparatus 110 and the communication receiving apparatus 150, or manage the communication transmitting apparatus 110 and the communication receiving apparatus 150 by control signals.

Figure 3:
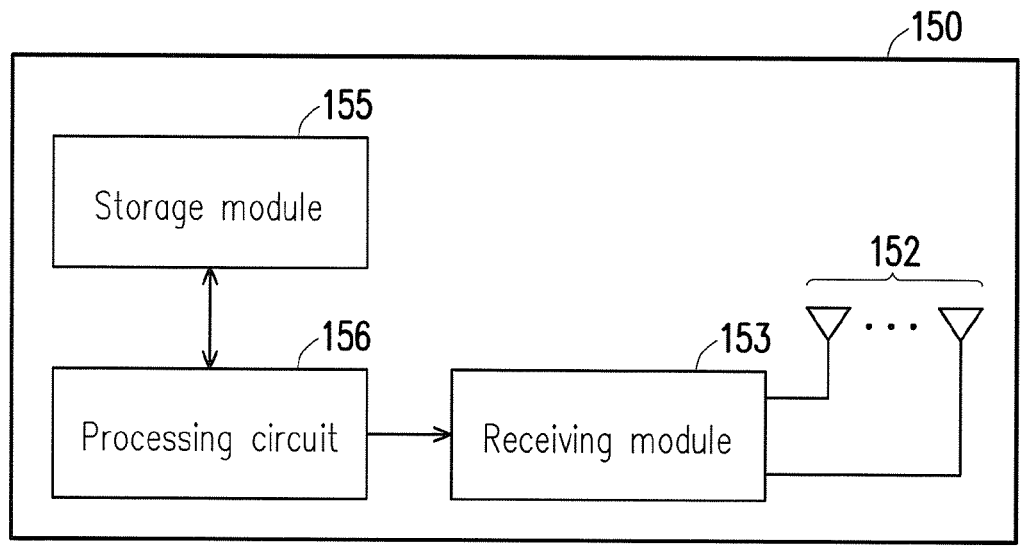
FIG. 3 is a block diagram illustrating a communication receiving apparatus according to an embodiment of the present disclosure.

For forms of implementation of the communication receiving apparatus 150, refer to the communication transmitting apparatus 110. FIG. 3 is a block diagram illustrating a communication receiving apparatus 150 according to an embodiment. The communication receiving apparatus 150 can be represented by at least the functional elements illustrated in FIG. 3. The communication receiving apparatus 150 may include at least (but not limited to) one or more of the antenna unit 152, the receiving module 153, the storage module 155, and the processing circuit 156.

The receiving module 153 is configured to wirelessly transmit uplink signals. The receiving module 153 can also execute operations such as low-noise amplification, impedance matching, frequency mixing, down frequency conversion, filtering, amplification, analog-to-digital signal conversion, and other similar operations. The receiving module 153 may be integrated into a chip or be composed of individual components or modules, and may be implemented through hardware or software.

Refer to the implementation of the storage module 115 of FIG. 2 for the implementation of the storage module 155. Refer to the implementation of the storage module 116 of FIG. 2 for the implementation of the storage module 156. The details are not repeated herein.

The processing circuit 156 is configured to process a digital signal and performs a signal receiving method according to an exemplary embodiment of the disclosure. Moreover, the processing circuit 156 is coupled to the storage module 155 to store program codes, device configurations, buffer or permanent data, and can also record modules executed by the processing circuit 156. For example, the processing circuit 156 can load a digital signal processing module to perform signal processing such as generating a data stream, encoding, serial to parallel/parallel to serial conversion, constellation mapping, de-modulation processing, channel estimation, equalization, synchronization, symbol detection, convolution calculation, and conjugate transform. Alternatively, the processing circuit 156 can load a communication signaling processing module so as to perform a signaling control based on the communication technology to which it belongs.

Note that the various signal processing performed by the processing circuit 156 can also be performed through hardware component, module, or one or more devices such as demodulators, multipliers, adders, duplexers, multiplexers, shifters, selectors, or a combination thereof. Whether the processing circuit 156 is implemented in hardware or software manner is not particularly limited by the signal receiving method proposed according to an embodiment.

Figure 4:
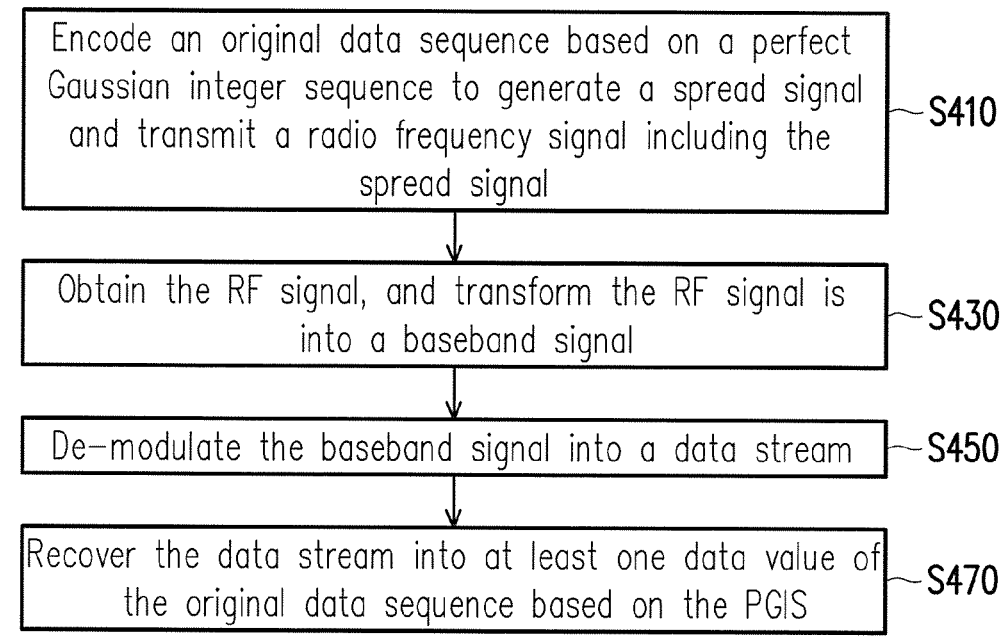
FIG. 4 is a flowchart of a signal processing method of the communication system of FIG. 1 according to an embodiment of the present disclosure.

To facilitate understanding of the operation procedure of the disclosure, the following embodiments explain a signal processing method and the signal receiving method of embodiments of the disclosure. FIG. 4 is a flowchart of a signal processing method of the communication system 100 of FIG. 1 according to an embodiment. Referring to FIG. 4, the method of the present embodiment is configured for a communication system 100, a communication transmitting apparatus 110, and a communication receiving apparatus 150. The following uses the elements of the communication transmitting apparatus 110 and the communication receiving apparatus 150 to explain the control method described in an embodiment. The steps of the method can be adjusted depending on the circumstances, and the disclosure is not particularly limited thereto.

Figure 5:
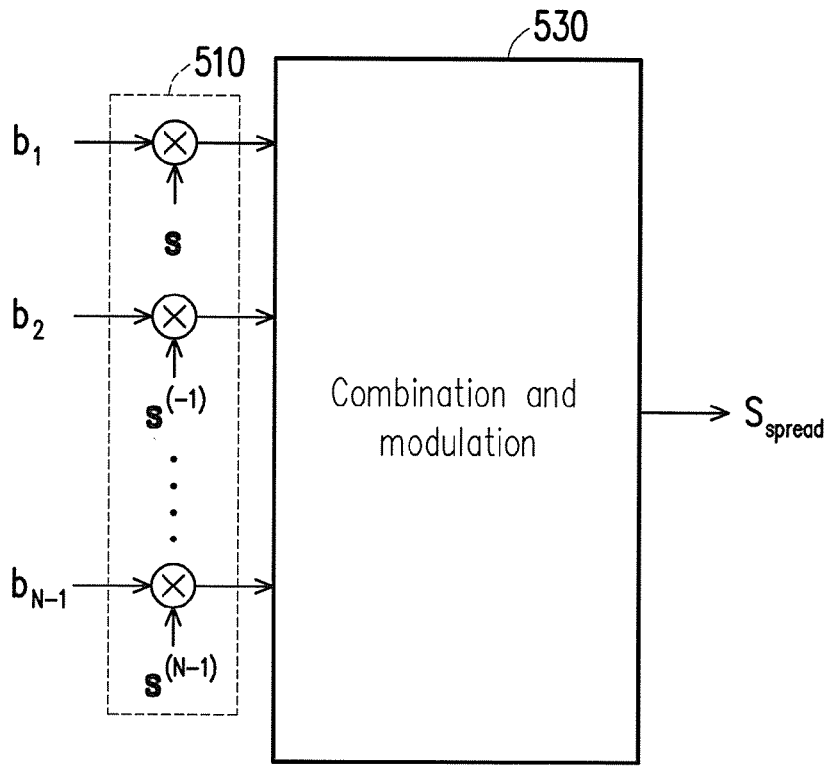
FIG. 5 is a schematic diagram illustrating a part of a reception structure of a processing circuit of a communication transmitting apparatus according to an embodiment of the present disclosure.
Figure 6:
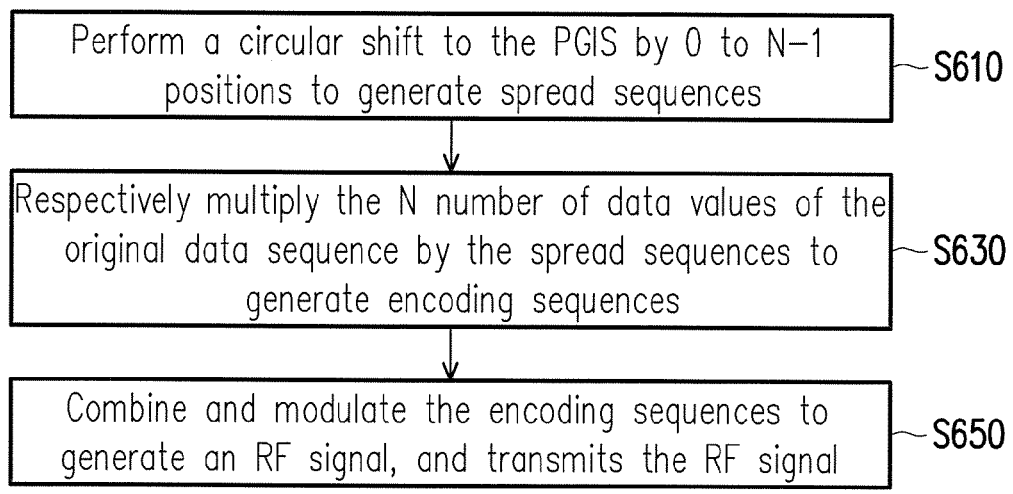
FIG. 6 is a flowchart of a signal transmitting method of a communication transmitting apparatus according to an embodiment of the present disclosure.

In step S410, the communication transmitting apparatus 110 may encode an original data sequence based on a perfect Gaussian integer sequence (PGIS) to generate a spread signal and transmit a radio frequency (RF) signal including the spread signal. More particularly, the following embodiment explains step S410 in more detail. FIG. 5 is a schematic diagram illustrating a part of a reception structure of a processing circuit 116 of a communication transmitting apparatus 110 according to an embodiment of the present disclosure. In view of hardware, the processing circuit 116 has at least an encoding module (not shown) capable of performing the multiplication 510 (the hardware implementation may be a digital processing unit, control unit, multiplexer, shifter, multiplier, adder, or a combination thereof), or an adder and a modulator (not shown) capable of combination and modulation 530. In addition, FIG. 6 is a flowchart illustrating a signal transmitting method of the communication transmitting apparatus 110 according to an embodiment of the present disclosure. The steps of the method can be adjusted depending on the circumstances, and the disclosure is not particularly limited thereto.

Referring to FIG. 5 and FIG. 6, in step S610, the processing circuit 116 may perform a circular shift to the PGIS by 0 to N-1 positions to generate spread sequences s, $s^{(-1)} \ldots s^{-(N-1)}$ (also referred to as encoding channels, which respectively correspond to a channel such as a broadcast channel (BCH), a paging channel (PCH), or a dedicated channel (DCH)). More particularly, the PGIS s matches the PGIS of any length proposed in reference [4] (e.g. 3-degree, 4-degree, 6-degree and 8-degree length 14, high degree, or double non-prime number length PGISs.) having ideal autocorrelation, with the bold letters representing vector. The storage module 115 stores the PGIS of reference [4] in advance or is provided PGIS by the base station 130 or the communication receiving apparatus 150.

In an embodiment, the original data sequence includes an N number of data values $b_0, b_1, \ldots b_{N-1}$, and N is a positive integer. Since the N data values are to be respectively encoded, the processing circuit 116 provides an N number of corresponding spread sequences s, $s^{(-1)} \ldots s^{-(N-1)}$. The superscript of $s^{(-1)}$ represents performing a circular shift on the PGIS s by one position (a negative value (-) represents right shift). The superscript of $s^{-(N-1)}$ represents performing a circular shift on the PGIS s by the N-1 position (a negative value (-) represents right shift), and so forth. In other words, the processing circuit 116 performs a circular shift to the PGIS s by 0 to N-1 positions to respectively generate spread sequences s, $s^{(-1)} \ldots s^{-(N-1)}$.

In step S630, the processing circuit 116 may respectively multiply the N number of data values $b_0, b_1 \ldots b_{N-1}$ of the original data sequence by the spread sequences s, $s^{(-1)} \ldots s^{-(N-1)}$ (by multiplication 510) to generate encoding sequences (i.e. $b_0 \cdot s, b_1 \cdot s^{(-1)} \ldots b_{N-1} \cdot s^{-(N-1)}$). The processing circuit 116 performs the multiplication calculations via a multiplier or software, but the disclosure does not set a particular limit thereto.

In step S650, the processing circuit 116 may combine and modulate the encoding sequences (i.e. $b_0 \cdot s, b_1 \cdot s^{(-1)} \ldots b_{N-1} \cdot s^{-(N-1)}$) (by the combination and modulation 530) to generate a RF signal, and transmit the RF signal. More particularly, the processing circuit 116 combines and modulates by an adder and a modulator (e.g. QPSK, QAM modulator) or in software manner which is not set a particular limit thereto, to generate a spread signal $S_{spread}$. The transmitting module 113 transforms (e.g. through amplification, up frequency conversion) the spread signal $S_{spread}$ into a RF signal, and transmits the RF signal through the antenna unit 112.

Referring further to FIG. 4, in step S430, the processing circuit 156 of the communication receiving apparatus 150 may obtain the RF signal from the communication transmitting apparatus 110 through the receiving module 153, and transform the RF signal into a baseband signal. Refer to FIG. 3 for details of operation of the receiving module 153 (e.g. down frequency conversion, filtering, amplification). The details are not repeated herein.

In step S450, the processing circuit 156 of the communication receiving apparatus 150 de-modulates the baseband signal into a data stream (e.g. through demodulators such as QPSK and QAM demodulators). The communication receiving apparatus 150 performs de-modulation to the generate data stream based on the de-modulation method (e.g. the combination and modulation 530) of the communication transmitting apparatus 110.

In step 470, the data stream is recovered into at least one data value of the original data sequence $b_0, b_1 \ldots b_{N-1}$ based on the PGIS by the processing circuit 156 of the communication receiving apparatus 150. More particularly, the processing circuit 156 of the communication receiving apparatus 150 generates despread sequences based on the PGIS and respectively performs modulo-N circular convolution on the despread sequences with the data stream to obtain one or more decoding sequences, and respectively select one data value from each decoding sequence to combine into at least one data value of the original sequence $b_0, b_1 \ldots b_{N-1}$. The disclosure proposes two reception structures, explained in the following embodiments.

Figure 7:
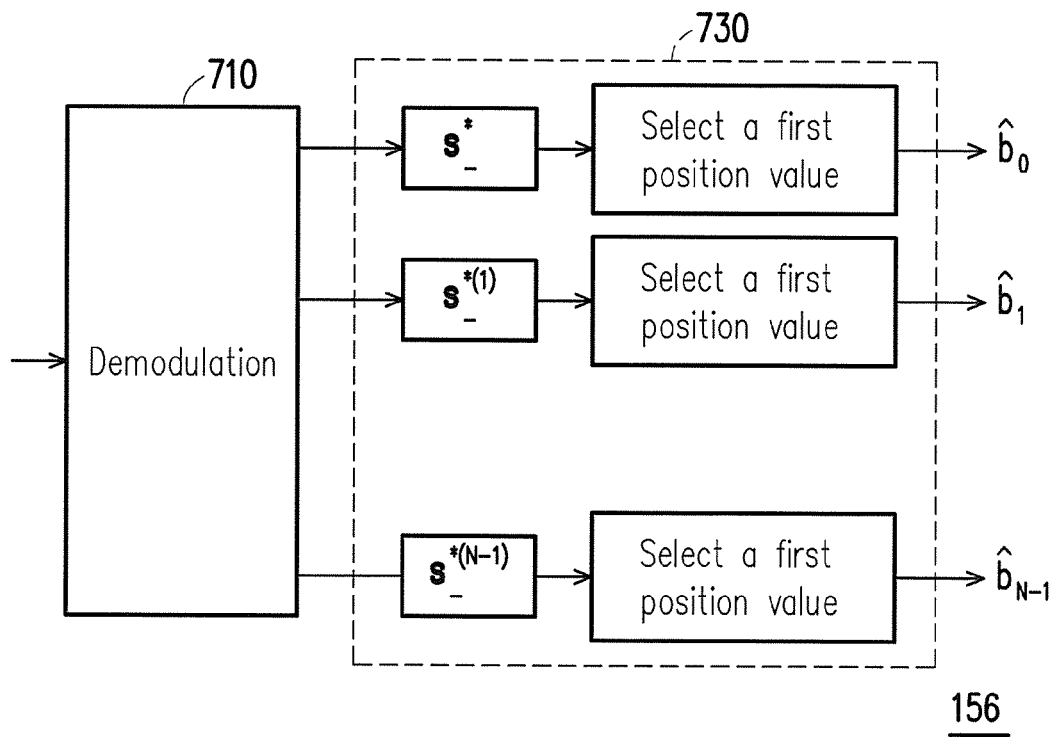
FIG. 7 is a schematic diagram illustrating a part of a reception structure of a processing circuit according to an embodiment of the present disclosure.

In an embodiment, FIG. 7 schematic diagram illustrating a part of a reception structure of the processing circuit 156 according to an embodiment. Referring to FIG. 7, in view of hardware, the processing circuit 156 includes at least (but not limited to) a demodulator and an encoding module 730 (the hardware implementation may be a digital processing unit, control unit, multiplexer, shifter, multiplier, adder, or a combination thereof) to perform a demodulation 710 or step S450. In the present embodiment, the decoding module 730 performs a conjugate transform on the PGIS and performs a circular shift to the conjugate-transformed PGIS s* by 0 to N-1 positions to generate an N number of the despread sequences $s\_^*, s\_^{*(1)} \ldots s\_^{*(N-1)}$ (or referred to as decoding channels, each respectively corresponding to a channel). The storage module 155 stores the PGIS of reference [4] in advance or is provided to the PGIS by the base station 130 or the communication receiving apparatus 110.

Next, the decoding module 730 performs sequence to parallel conversion on the data stream, and then respectively performs a modulo-N circular convolution on the despread sequences with the N despread sequences $s\_^*, s\_^{*(1)}, \ldots, s\_^{*(N-1)}$ to obtain N number of decoding sequences. The step can be illustrated with equation (1):

$$x \otimes_N s_\_^{*(k)} = \sum_{m=0}^{N-1} b_m s^{(-m)} \otimes_N s_\_^{*(k)} \quad (1)$$

$$= \sum_{m=0}^{N-1} b_m E \cdot \delta_N[(n-k+m)_N]$$

$$= E \cdot (b_k, b_{k-1}, \ldots, b_0, b_{N-1}, \ldots, b_{k+1})$$

The x is a data stream $$\left(\text{i.e. } \sum_{m=0}^{N-1} b_m s_m\right),$$

the k is a positive integer and $0 \le k \le N-1$, the $\otimes_N$ represents the modulo-N circular convolution. The E is the average power of PGIS s. The $\delta[\tau]$ is a function of a pulse sequence. Note that for easy illustration, the data stream is assumed to exclude channel response (e.g. without passing through the channel or having be compensated by an equalizer). In actual implementation, the RF signal obtained by the communication receiving apparatus 150 is usually channel faded or distorted.

We know from an autocorrelation function of the PGIS that the PGIS has ideal autocorrelation:

$$R_s \equiv s \otimes s_{-1}^* = E\delta[\tau] \quad (2)$$

$$S \cdot S = |S|^2 \quad (3)$$

Here, the $\delta[\tau]$ is a function of the pulse sequence function, and S is the discrete Fourier transformation (DFT) of PGIS s. Furthermore, the pulse sequence function has a flat magnitude (or equal magnitude) spectrum. That is, the equation (4):

$$|S[n]| = \sqrt{E}, \forall 0 \le n \le N-1 \quad (4)$$

In other words, the PGIS s is a perfect sequence constructed in view of both time domain and frequency domain.

After obtaining the N decoding sequences, the decoding module 710 selects a first position value from each of the decoding sequences respectively, and the N first position values of the decoding sequences respectively corresponds to one of the N data values (i.e. $b_0$, $b_1$, ... $b_{N-1}$). More particularly, from equation (1), we can know a modulo-N circular convolution is performed on the data stream (i.e., and the k-th encoding channel (i.e., $s\_^{*(k)}$), and the first position data of sequence which is $\hat{b}_k = E \cdot b_k$ can be obtained. In other words, the first position value obtained from performing the modulo N circular convolution on the data stream with the 0-th channel (i.e. s) is $\hat{b}_0 = E \cdot b_0$, and accordingly, the first position value obtained from performing the modulo N circular convolution on the data stream with the N-1-th channel (i.e. $s\_^{*(N-1)}$) is $\hat{b}_{N-1} = E \cdot b_{N-1}$. The decoding module 730 can sequentially arrange sequences $\hat{b}_0$ to $\hat{b}_{N-1}$ (i.e., $E \cdot (b_0, b_1, \ldots, b_{N-2}, b_{N-1})$ original data sequence ($b_0$, $b_1$, ..., $b_{N-2}$, $b_{N-1}$) is multiplied by the average power E). According, the reception structure in FIG. 7 can recover the original data sequence at once.

Figure 8:
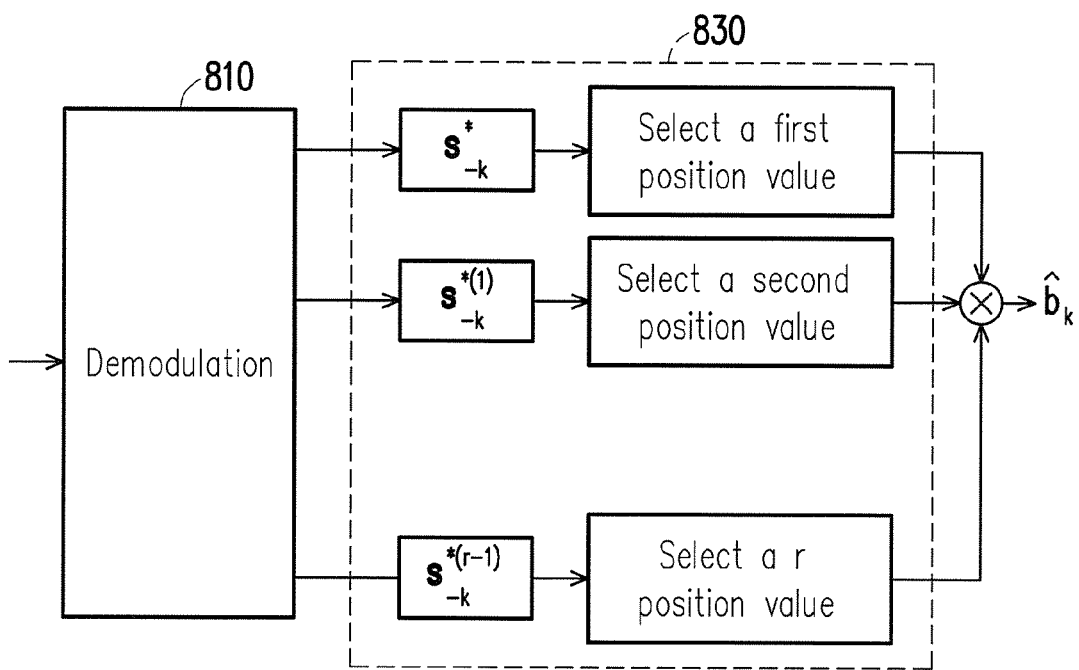
FIG. 8 is a schematic diagram illustrating a part of a reception structure of a processing circuit according to another embodiment of the present disclosure.

In another embodiment, FIG. 8 is a schematic diagram illustrating a part of a reception structure of the processing circuit 156 according to an embodiment of the present disclosure. Referring to FIG. 8, in view of hardware, the processing circuit 156 includes at least (but not limited to) a demodulator and an encoding module 830 (the hardware implementation may be a digital processing unit, control unit, multiplexer, shifter, multiplier, adder, or a combination thereof) to perform a demodulation 810 or step S450. In the present embodiment, the decoding module determines the k-th data value of the original data sequence to be recovered (i.e. $\hat{b}_k = E \cdot b_k$), where the k is a positive integer and $0 \le k \le N-1$. The decoding module 830 performs a conjugate transform on the PGIS $s_k (s_k = \{s_k[n]\}_{n=0}^{N-1})$ and generates r number of despread sequences $s_{-k}^*$, $s_{-k}^{*(1)}$, ... $s_{-k}^{*(r-1)}$ (or called decoding channels, each respectively corresponding to a channel). Define $s_{-k}^{*(r-1)} = \{s_k^*[(1-r-n)_N]\}_{n=0}^{N-1}$, where the r is a positive integer.

Note that the S in bold representing vector and the s in light face type (not in bold) represents elements of vector s.

Next, the decoding module 830 performs serial to parallel conversion on the data stream, and then respectively performs a modulo-N circular convolution on the despread sequences with the despread sequences $s_{-k}^*$, $s_{-k}^{*(1)}$, ..., $s_{-k}^{*(r-1)}$ to obtain N number of decoding sequences. The decoding module 830 sequentially selects first position to r-th position values from the N decoding sequences, and sums (e.g. through an adder) the first position value to the r-th position value to obtain the k-th data value. The step can be illustrated with equation (5):

$$x \otimes_N s_r = \sum_{m=0}^{N-1} b_m s_m \otimes_N (s_{-k}^* + s_{-k}^{*(1)} + \ldots + s_{-k}^{*(r-1)}) \quad (5)$$

$$= \sum_{m=0, m \ne k}^{N-1} b_m s_m \otimes_N (s_{-k}^* + s_{-k}^{*(1)} + \ldots + s_{-k}^{*(r-1)}) +$$

$$E \cdot (\underbrace{b_k, \ldots, b_k}_{r}, \underbrace{0, \ldots, 0}_{N-r})$$

Here x is data stream $$\left(\text{i.e., } \sum_{m=0}^{N-1} b_m s_m\right),$$

k is positive integer $0 \le k \le N-1$, $\otimes_N$ representing the modulo-N circular convolution. Note that for easy illustration, the data stream is assumed to exclude channel response (e.g. without passing through the channel or having be compensated by an equalizer).

From equation (5), the decoding module 830 can obtain $\hat{b}_k = E \cdot b_k$ (corresponding to the k-th data value $b_k$). Accordingly, the reception structure in FIG. 8 can recover data corresponding to a specific position.

Note that in the back end of the reception structure in FIG. 7 and FIG. 8, the processing circuit 156 can further perform processes such as a soft decision, a hard decision, a cycle redundancy check (CRC), but the disclosure does not set a particular limit thereto.

Figure 9:
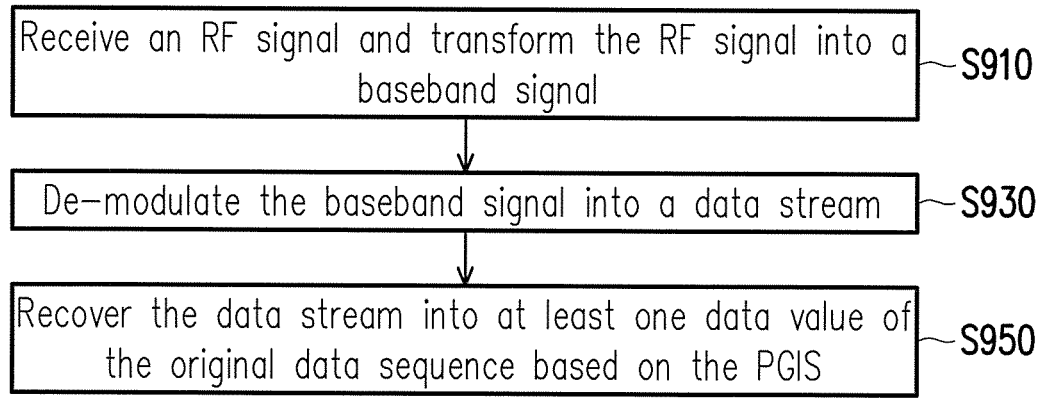
FIG. 9 is a flowchart of a signal receiving method of the communication receiving apparatus according to an embodiment of the present disclosure.

From another viewpoint, FIG. 9 is a flowchart of a signal receiving method of the communication receiving apparatus 150 according to an embodiment. Referring to FIG. 9, the method of the embodiment is configured for a communication receiving apparatus 150. The following uses elements of the communication receiving apparatus 150 to explain the control method described in an embodiment of the disclosure. The steps of the method can be adjusted depending on the circumstances, and the disclosure is not particularly limited thereto.

A processing circuit 156 may receive a RF signal through a receiving module 153 and transform the RF signal into a baseband signal (step S910). The RF signal includes a spread signal obtained from encoding an original data sequence based on a PGIS. The PGIS has ideal autocorrelation. The processing circuit 156 de-modulates the baseband signal into a data stream (e.g. the demodulation 710 of FIG. 7 or the demodulation 810 of FIG. 8) (step S930). The processing module 156 (e.g. through the decoding module 730 of FIG. 7 or the decoding module 830 of FIG. 8) recovers the data stream into at least one data value of the original data sequence based on the PGIS (step S950). For example, the reception structure in FIG. 7 can recover N number of data values $b_0, b_1, \ldots b_{N-1}$ of the original data sequence at the same time. Or, the reception structure in FIG. 8 can recover the k-th data value particularly.

It should be noted that the details of the above steps are explained in the explanations of FIG. 1 to FIG. 8, and are not repeated here.

It should also be noted that the descriptions "first," "second", "third," or similar reference are merely to describe and distinguish a subject or an item from another subject or item, and may or may not imply an order.

Based on the above, the communication receiving apparatus, the signal receiving method thereof, the signal processing method, and the signal transmitting method encode and decode data based on PGIS of any length, and can be effectively implemented in CDMA channel encoding technology popularly used in mobile phones. Compare to known CDMA structures, the embodiments of the disclosure have the following features:

The length of known CDMA sequences are limited to N=2 m−1, where the m is a sequence bit. In at least one embodiment of the present disclosure, the length of sequence (e.g. PGIS s) can be any length.

In at least one embodiment, the number of encoding channels is greater than the known CDMA structures. Since the PGIS can be of any length, the number of channels can be increased.

Increasing the length of sequences in traditional CDMA structure increases the signal to noise ratio, but increase sequence length takes up available bandwidth. However, bandwidth is a natural resource similar to land, which cannot be made. In at least one embodiment of the disclosure, the signal to noise ratio is increased through increase of system energy, such that energy can be more easily increased.

Compare to traditional CDMA structure, when length of sequence are identical, at least one embodiment of the disclosure has smaller channel crosstalk. In other words, in at least one embodiment of the disclosure, the channel cross talk suppression capabilities are greater than that of a traditional CDMA structure.

In terms of circuit hardware structure of the receptor, a first level decoding of at least one embodiment (e.g. the de-modulation 710 of FIG. 7 or the de-modulation 810 of FIG. 8) is identical or similar to traditional CDMA structure. As a result, the at least one embodiment of the disclosure does not increase the cost of hardware.

Existing CDMA structure has only two types of voltage signal magnitude: +1 and −1. This is beneficial to simplification of receptor circuit design. In at least one embodiment, there are numerous possibilities of received voltage signal magnitude. However, through Fast Fourier Transformation (FFT), after the signal is converted from time domain to frequency domain, signals with equal magnitude can be obtained. Therefore, at least one embodiment also benefits from simplified circuit design.

Even though the disclosure is disclosed through the embodiments as above, the embodiments are not used to limit this disclosure, and any person with ordinary skill in the art, without deviating from the teachings and scope of this disclosure, may make adjustments and refinements; therefore, the scope of protection of this patent is defined as following claims.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A communication receiving apparatus based on code division multiple access (CDMA) technology, comprising:
   receiver, configured to receive a RF signal and transform the RF signal into a baseband signal, wherein the RF signal comprises a spread signal obtained from encoding an original data sequence based on a perfect Gaussian integer sequence (PGIS), an autocorrelation function of the PGIS is a one-pulse sequence function, and the PGIS has a spectrum with all equal magnitude; and
   a processing circuit, coupled to the receiver, performing comprising:
      demodulating the baseband signal into a data stream;
      generating a plurality of despread sequences based on the PGIS;
      performing a modulo-N circular convolution on the despread sequences with the data stream, respectively, to obtain a plurality of decoding sequences; and
      selecting one data value from each of the decoding sequences to combine selected data values of the decoding sequence into at least one data value of the original sequence, respectively,
      so as to recover the data stream into at least one data value of the original data sequence based on the PGIS, wherein the original data sequence comprises an N data values, and N is a positive integer.

2. The communication receiving apparatus of claim 1, wherein the processing circuit performs a conjugate transform on the PGIS and performs a circular shift to the conjugate-transformed PGIS by 0 to N−1 positions to generate N number of the despread sequences.

3. The communication receiving apparatus of claim 2, wherein the processing circuit selects a first position value from each of the decoding sequences respectively, and the first position values of the decoding sequences each respectively corresponds to one of the N data values.

4. The communication receiving apparatus of claim 1, wherein the processing circuit determines a k-th data value of the original data sequence to be recovered, k is a positive integer and 0≤k≤N−1, and the processing circuit performs a conjugate transform on the PGIS $s_k$ and generates r number of the despread sequences $s_{-k}{}^*, s_{-k}{}^{*(1)}, \ldots s_{-k}{}^{*(r-1)}$, r is a positive integer, and defines $s_k = \{s_k[n]\}_{n=0}^{N-1}$ and $s_{-k}{}^{*(r-1)} = \{s_k{}^*[(1-r-n)_N]\}_{n=0}^{N-1}$, with the s in bold representing a vector and the s not in bold represents elements of vector s.

5. The communication receiving apparatus of claim 4, wherein the processing circuit sequentially selects first position value to r-th position value from the decoding sequences, and sums the first position value to the r-th position value to obtain the k-th data value.

6. The communication receiving apparatus of claim 1, wherein the spread signal is the sum of each data value of the original data sequence respectively multiplied by the plurality of spread sequences with circular shifts by 0 to N−1 positions of the PGIS.

7. A signal receiving method configured for a communication receiving apparatus based on CDMA, the signal receiving method comprising:
   receiving a RF signal and transforming the RF signal into a baseband signal, wherein the RF signal comprises a spread signal obtained from encoding an original data sequence based on a PGIS, wherein an autocorrelation function of the PGIS is a one-pulse sequence function and the PGIS has a spectrum with all equal magnitude;
demodulating the baseband signal into a data stream;
generating a plurality of despread sequences based on the PGIS;
performing a modulo-N circular convolution on the despread sequences with the data stream, respectively, to obtain a plurality of decoding sequences; and
selecting one data value from each of the decoding sequences to combine selected data values of the decoding sequence into at least one data value of the original sequence, respectively,
so as to recover the data stream into the original data sequence based on the PGIS, wherein the original data sequence comprises an N data values, and N is a positive integer.

8. The signal receiving method of claim 7, wherein steps of generating the despread sequences according to the PGIS comprise:
performing a conjugate transform on the PGIS; and
performing a circular shift on the conjugate-transformed PGIS by 0 to N−1 positions to generate N number of the despread sequences.

9. The signal receiving method of claim 8, wherein steps of respectively selecting one data value from each of the decoding sequences to combine selected data values of the decoding sequence into at least one data value of the original sequence comprise:
respectively selecting a first position value from each of the decoding sequences, wherein the first position values of the decoding sequences each respectively correspond to one of the N data values.

10. The signal receiving method of claim 7, wherein steps of generating the despread sequences according to the PGIS comprise:
determining the k-th value of the original data sequence to be recovered, k is a positive integer, and $0 \leq k \leq N-1$;
performing a conjugate transform on the PGIS $s_k$; and
generating an r number of the despread sequences $s_{-k}^*$, $s_{-k}^{*(1)}, \ldots s_{-k}^{*(r-1)}$, r is a positive integer, and defining $s_k = \{s_k[n]\}_{n=0}^{N-1}$ and $s_{-k}^{*(r-1)} = \{s_k^*[(1-r-n)_N]\}_{n=0}^{N-1}$, with the s in bold representing a vector and the s not in bold representing elements of the vector s.

11. The signal receiving method of claim 10, wherein steps of respectively selecting one data value from each of the decoding sequences to combine selected data values of the decoding sequence into at least one data value of the original sequence comprise:
sequentially selecting the first position value to the r-th position value from the decoding sequences; and
summing the first position value to the r-th position value to obtain the k-th data value.

12. The signal receiving method of claim 7, wherein the spread signal is the sum of each data value of the original data sequence respectively multiplied by the plurality of spread sequences with circular shifts performed at 0 to N−1 positions of the PGIS.

13. A signal transmitting method configured for a communication transmitting apparatus based on CDMA, the signal transmitting method comprising:
performing a circular shift on a PGIS by 0 to N−1 positions to generate a plurality of spread sequences, wherein an original data sequence comprises N number of data values, N is a positive integer, and an autocorrelation function of the PGIS is a one-pulse sequence function and the PGIS has a spectrum with all equal magnitude;
respectively multiplying the N number of data values of the original data sequence by the spread sequences to generate a plurality of encoding sequences; and
combining and modulating the encoding sequences to generate a RF signal and transmitting the RF signal.

* * * * *